(12) United States Patent
Ono et al.

(10) Patent No.: US 11,170,246 B2
(45) Date of Patent: Nov. 9, 2021

(54) RECOGNITION PROCESSING DEVICE, RECOGNITION PROCESSING METHOD, AND PROGRAM (71) Applicant: Sony Interactive Entertainment Inc., Tokyo (JP)

(72) Inventors: Daichi Ono, Kanagawa (JP); Tsutomu Horikawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 119 days.

(21) Appl. No.: 16/621,544

(22) PCT Filed: Jul. 12, 2017

(86) PCT No.: PCT/JP2017/025437
§ 371 (c)(1),
(2) Date: Dec. 11, 2019

(87) PCT Pub. No.: WO2019/012632
PCT Pub. Date: Jan. 17, 2019

(65) Prior Publication Data
US 2021/0056337 A1    Feb. 25, 2021

(51) Int. Cl.
*G06K 9/32*      (2006.01)
*G06K 9/00*      (2006.01)
(Continued)

(52) U.S. Cl.
CPC ....... *G06K 9/3233* (2013.01); *G06K 9/00624* (2013.01); *G06N 3/04* (2013.01); *G06N 3/08* (2013.01)

(58) Field of Classification Search
CPC .... G06K 9/3233; G06K 9/00624; G06N 3/04; G06N 3/08; G06T 7/00
(Continued)

(56) References Cited

U.S. PATENT DOCUMENTS 7,031,506 B2   4/2006   Tsujii
9,589,344 B2   3/2017   Shibahara
(Continued)

FOREIGN PATENT DOCUMENTS

JP   04276785 A     10/1992
JP   2002325754 A   11/2002
(Continued)

OTHER PUBLICATIONS

Lecun, "Gradient-based learning applied to document recognition," IEEE pp. 2278-2324, Publication year 1998.*
(Continued)

*Primary Examiner* — Juan A Torres
(74) *Attorney, Agent, or Firm* — Matthew B. Dernier, Esq.

(57) ABSTRACT

Provided are a recognition processing device, a recognition processing method, and a program capable of efficiently narrowing down a three-dimensional region on which recognition processing using a three-dimensional convolutional neural network is to be executed. A first recognition process executing section executes a first recognition process on a captured image obtained by capturing an image of a real space and used to generate voxel data. A target two-dimensional region determining section determines a two-dimensional region occupying part of the captured image on the basis of a result of the first recognition process. A target three-dimensional region determining section determines a three-dimensional region in the real space on the basis of the two-dimensional region and a position of a camera when the camera obtains the captured image. A second recognition process executing section executes a second recognition process using a three-dimensional convolutional neural network on the voxel data associated with a position in the three-dimensional region.

7 Claims, 7 Drawing Sheets

(51) Int. Cl.
*G06N 3/04* (2006.01)
*G06N 3/08* (2006.01)

(58) Field of Classification Search
USPC .......................................................... 382/103
See application file for complete search history.

(56) References Cited

U.S. PATENT DOCUMENTS

| | | | |
|---|---|---|---|
| 10,460,511 B2* | 10/2019 | Ondruska | ............... G06T 7/579 |
| 2003/0007674 A1 | 1/2003 | Tsujii | |
| 2009/0232353 A1* | 9/2009 | Sundaresan | ........ G06K 9/00342 |
| | | | 382/103 |
| 2016/0005167 A1 | 1/2016 | Shibahara | |
| 2016/0071318 A1* | 3/2016 | Lee | ...................... G06K 9/4609 |
| | | | 345/419 |

FOREIGN PATENT DOCUMENTS

| | | | |
|---|---|---|---|
| JP | 2016209399 A | * | 12/2016 |
| JP | 2016209399 A | | 12/2016 |
| WO | 2014103061 A1 | | 7/2014 |

OTHER PUBLICATIONS

Socher, "Convolutional-Recursive Deep Learning for 3D Object Classification," In Advances in Neural Information Processing Systems 25, Publication year 2012.*
International Search Report for corresponding PCT Application No. PCT/JP2017/025437, 4 pages, dated Aug. 15, 2017.
Hiroki Watanabe et al., "Detection of Moving Objects Using Inconspicuous Stereo Omnidirectional System", The Institute of Electrical Engineers of Japan Kenkyukai Shiryo, pp. 17 to 22, Jan. 27, 2006.
Ren Kanai, Satoru Fujita, "Rittai Filter 0 Mochiita Tatamikomi Neural Network ni yoru Sanjigen Buttai Ninshiki", Dai 78 Kai (Heisei 28 Nen) Zenkoku Taikai Koen Ronbunshu(2) Jinko Chino to Ninchi Kagaku, pp. 2-37 to 2-38, Mar. 10, 2016 (for relevancy see ISR cited above).
International Preliminary Report on Patentability and Written Opinion for corresponding PCT Application No. PCT/JP2017/025437, 13 pages, dated Jan. 23, 2020.
Decision of Refusal for corresponding JP Application No. 2019-529380, 5 pages, dated Oct. 20, 2020.
Notice of Reasons for Refusal for corresponding JP Application No. 2019-529380, 6 pages, dated Jul. 30, 2020.

* cited by examiner

| THREE-DIMENSIONAL COORDINATE VALUE | VOXEL VALUE |
|---|---|
| (a1,b1,c1) | p1 |
| (a2,b2,c2) | p2 |
| (a3,b3,c3) | p3 |

RECOGNITION PROCESSING DEVICE, RECOGNITION PROCESSING METHOD, AND PROGRAM

TECHNICAL FIELD

The present invention relates to a recognition processing device, a recognition processing method, and a program.

BACKGROUND ART

A technology has been known which performs recognition processing such as object recognition in a three-dimensional space by executing recognition processing using a three-dimensional convolutional neural network on voxel data that associates positions in a three-dimensional space with voxel values. The voxel data used in such a recognition processing technology is generated by using, for example, a captured image obtained by capturing an image of a three-dimensional space.

SUMMARY

Technical Problem

In general, the calculation cost of recognition processing using a three-dimensional convolutional neural network is high. For this reason, the number of voxels to be subjected to recognition processing using a three-dimensional convolutional neural network is desired to be as small as possible.

Here, in order to reduce the calculation cost of the recognition processing using the three-dimensional convolutional neural network, for example, it is conceivable to narrow down the three-dimensional region to be subjected to the recognition processing before executing the recognition processing.

In this case, however, it is troublesome and inefficient to separately prepare data for narrowing down the three-dimensional region.

The present invention has been made in view of the above problems, and one of the objects is to provide a recognition processing device, a recognition processing method and a program capable of efficiently narrowing down a three-dimensional region on which recognition processing using a three-dimensional convolutional neural network is executed.

Solution to Problem

In order to solve the abovementioned problem, the recognition processing device according to the present invention is a recognition processing device executing recognition processing using a three-dimensional convolutional neural network on voxel data in which a position in a real space and a voxel value are associated with each other. The recognition processing device includes: a first recognition process executing section executing a first recognition process on a captured image which is obtained by capturing an image of the real space and which is used to generate the voxel data; a two-dimensional region determining section determining a two-dimensional region occupying part of the captured image on a basis of a result of the first recognition process; a three-dimensional region determining section determining a three-dimensional region in the real space on a basis of the two-dimensional region and a position of a camera when the camera obtains the captured image; and a second recognition process executing section executing a second recognition process using a three-dimensional convolutional neural network on the voxel data associated with a position in the three-dimensional region.

According to an aspect of the present invention, the first recognition process executing section executes the first recognition process on each of a first captured image and a second captured image obtained by capturing images of the real space from positions different from each other. The two-dimensional region determining section determines a first two-dimensional region occupying part of the first captured image and a second two-dimensional region occupying part of the second captured image on a basis of a result of the first recognition process. The three-dimensional region determining section determines a first three-dimensional region determined on a basis of the first two-dimensional region and a position of a camera when the camera obtains the first captured image, and a second three-dimensional region determined on a basis of the second two-dimensional region and a position of a camera when the camera obtains the second captured image. The second recognition process executing section executes the second recognition process using the three-dimensional convolutional neural network on the voxel data associated with a position in the three-dimensional region in the real space according to the first three-dimensional region and the second three-dimensional region.

In this aspect, the second recognition process executing section may execute the second recognition process using the three-dimensional convolutional neural network on the voxel data associated with a position in the three-dimensional region where the first three-dimensional region and the second three-dimensional region intersect.

In an aspect of the present invention, the first recognition process executing section executes the first recognition process on a captured image associated with depth information, and the three-dimensional region determining section determines the three-dimensional region in the real space on a basis of the depth information associated with a position in the two-dimensional region.

In an aspect of the present invention, the first recognition process executing section executes the first recognition process using a two-dimensional convolutional neural network on the captured image.

The recognition processing method according to the present invention is a recognition processing method for executing recognition processing using a three-dimensional convolutional neural network on voxel data in which a position in a real space and a voxel value are associated with each other. The recognition processing method includes: a step of executing a first recognition process on a captured image which is obtained by capturing an image of the real space and which is used to generate the voxel data; a step of determining a two-dimensional region occupying part of the captured image on a basis of a result of the first recognition process; a step of determining a three-dimensional region in the real space on a basis of the two-dimensional region and a position of a camera when the camera obtains the captured image; and a step of executing a second recognition process using a three-dimensional convolutional neural network on the voxel data associated with a position in the three-dimensional region.

The program according to the present invention causes a computer that executes recognition processing using a three-dimensional convolutional neural network on voxel data in which a position in a real space and a voxel value are associated with each other to execute: a procedure of executing a first recognition process on a captured image which is obtained by capturing an image of the real space and which is used to generate the voxel data; a procedure of determining a two-dimensional region occupying part of the captured image on a basis of a result of the first recognition process; a procedure of determining a three-dimensional region in the real space on a basis of the two-dimensional region and a position of a camera when the camera obtains the captured image; and a procedure of executing a second recognition process using a three-dimensional convolutional neural network on the voxel data associated with a position in the three-dimensional region.

DESCRIPTION OF EMBODIMENT

Hereinafter, an embodiment of the present invention will be described in detail with reference to the drawings.

Figure 1:
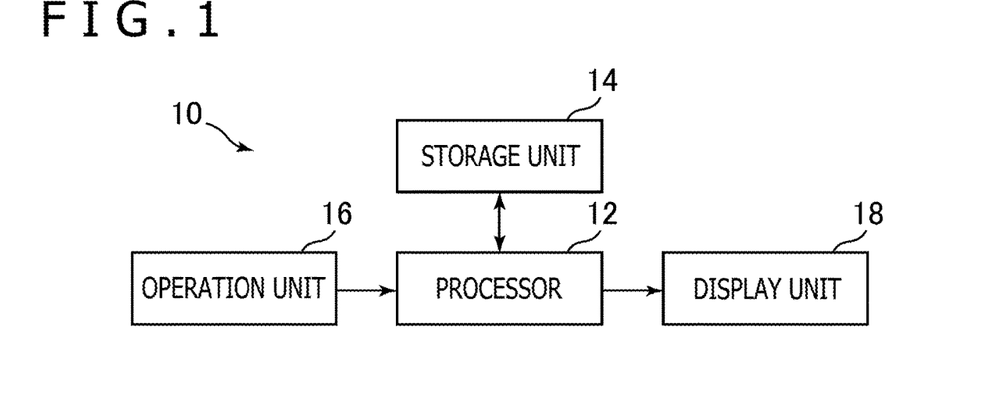
FIG. 1 is a configuration diagram of a recognition processing device according to an embodiment of the present invention.

FIG. 1 is a configuration diagram of a recognition processing device 10 according to the embodiment of the present invention. The recognition processing device 10 according to the present embodiment is a computer such as a game console or a personal computer. As illustrated in FIG. 1, the recognition processing device 10 according to the present embodiment includes a processor 12, a storage unit 14, an operation unit 16, and a display unit 18, for example.

The processor 12 is a program control device such as a central processing unit (CPU) that operates according to a program installed in the recognition processing device 10, for example.

The storage unit 14 is a storage element such as a read only memory (ROM) or a random access memory (RAM), a hard disk drive, or the like. The storage unit 14 stores a program and the like executed by the processor 12.

The operation unit 16 is a user interface such as a keyboard, a mouse, or a game console controller, and receives a user's operational input and outputs a signal indicating the content to the processor 12.

The display unit 18 is a display device such as a liquid crystal display, and displays various images in accordance with instructions from the processor 12.

Note that the recognition processing device 10 may include a communication interface such as a network board, an optical disc drive that reads data from an optical disc such as a digital versatile disc (DVD)-ROM or a Blu-ray (registered trademark) disc, and a universal serial bus (USB) port.

Figure 2:
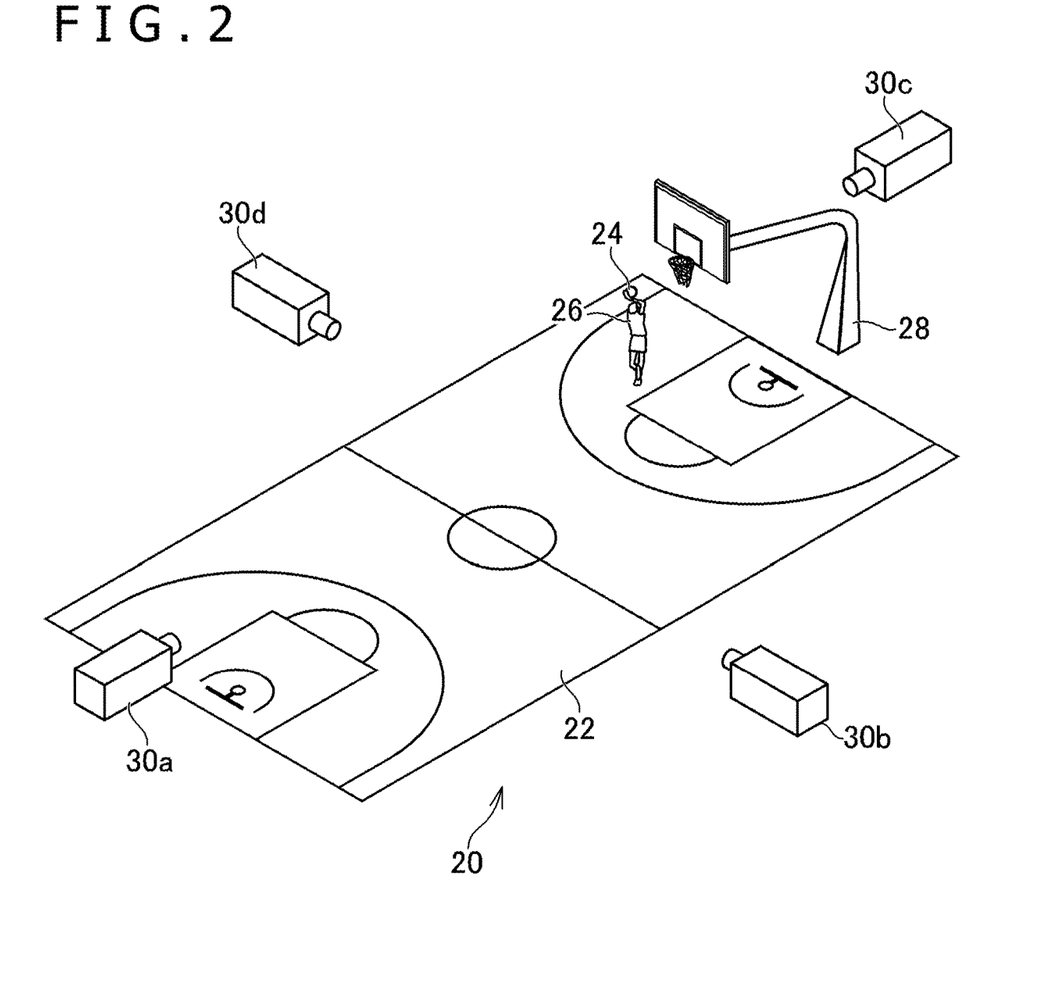
FIG. 2 is a diagram illustrating an example of a real space.

The recognition processing device 10 according to the present embodiment executes recognition processing such as object recognition on a real space 20 which is a three-dimensional space illustrated in FIG. 2, for example. In the real space 20 illustrated in FIG. 2, a player 26 holding a ball 24 on a basketball court 22 is about to shoot the ball 24 toward a goal 28. Here, in the present embodiment, it is assumed that a semantic segmentation process for estimating an outline of the player 26 and a voxel group corresponding to the player 26 in the real space 20 which is a three-dimensional space is executed.

In the present embodiment, a plurality of cameras 30 that capture images of the real space 20 from positions different from each other are arranged in the real space 20, as illustrated in FIG. 2. In the example of FIG. 2, four cameras 30 (30a, 30b, 30c, and 30d) are illustrated, but four or more cameras 30 may be arranged in the real space 20. Further, these cameras 30 may be cameras capable of capturing an image including depth information, such as a stereo camera or a camera with an infrared distance measuring sensor. In this case, a depth image indicating distribution of a distance from the camera 30 to a subject, associated with each pixel of the captured image, may be generated together, for example.

Figure 3:
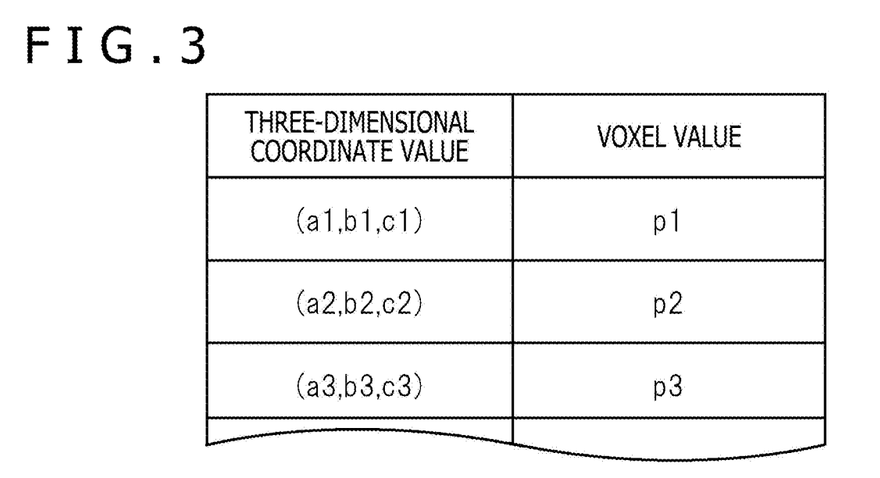
FIG. 3 is a diagram illustrating an example of voxel data.

In the present embodiment, voxel data illustrated in FIG. 3 is generated by a known method on the basis of images captured by the plurality of cameras 30, for example. As illustrated in FIG. 3, the voxel data includes a three-dimensional coordinate value and a voxel value. Here, for example, voxel data may be generated on the basis of information indicating a position, an orientation, and an angle of view of the camera 30 and an image captured by the camera 30 for each of the plurality of cameras 30. Further, voxel data may be generated on the basis of the captured image and the depth image. In addition, voxel data may be generated also using an image captured by the camera 30 that is not illustrated in FIG. 2.

In the present embodiment, before the semantic segmentation process is performed on the generated voxel data, recognition processing of a captured image 32 (see FIGS. 4A and 4B) captured by the camera 30 and used for generating the voxel data is executed.

Figure 4A:
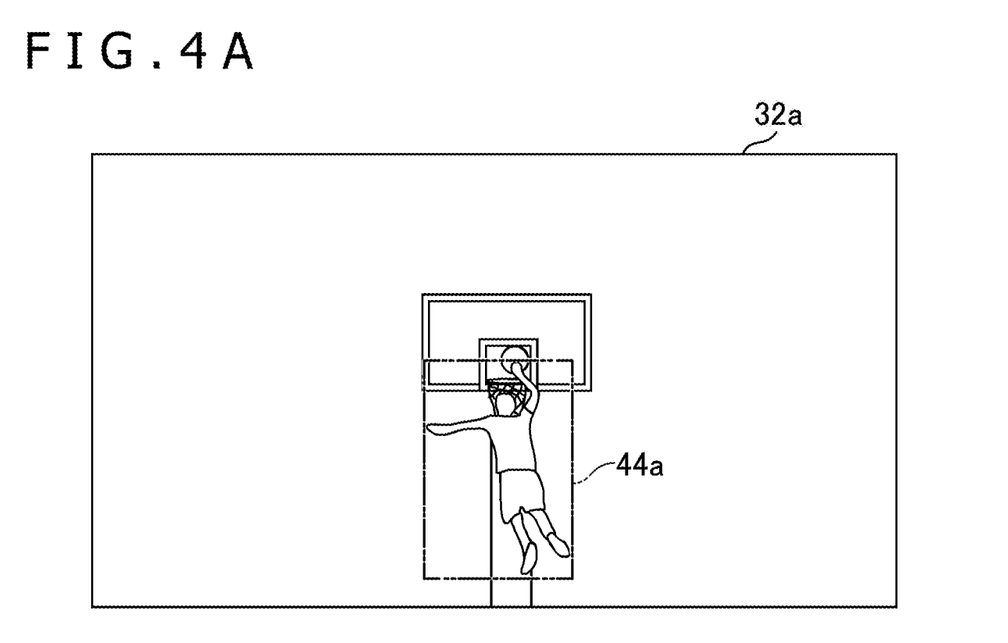
FIG. 4A is a diagram illustrating an example of a captured image.
Figure 4B:
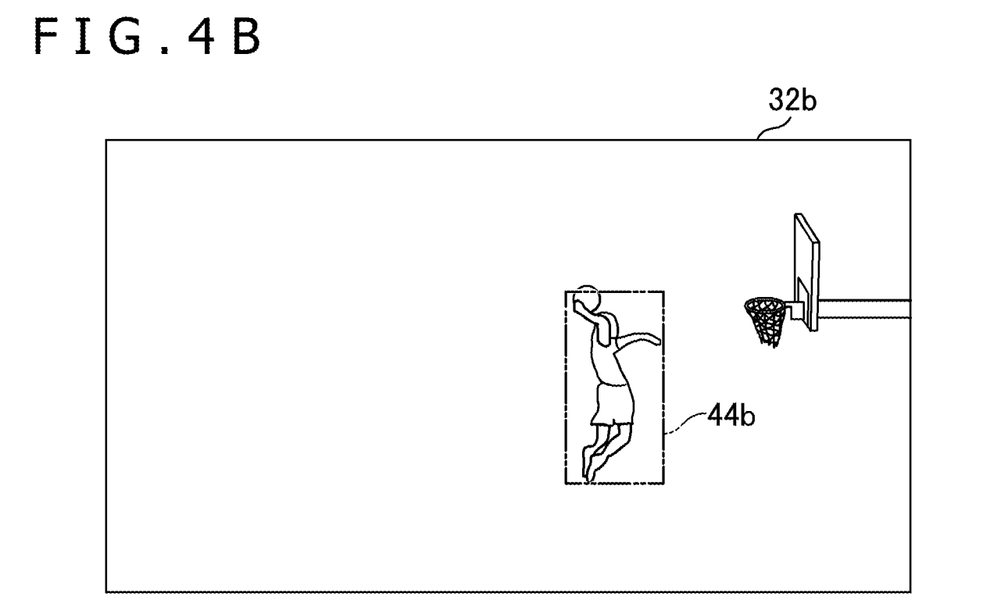
FIG. 4B is a diagram illustrating an example of a captured image.
Figure 5A:
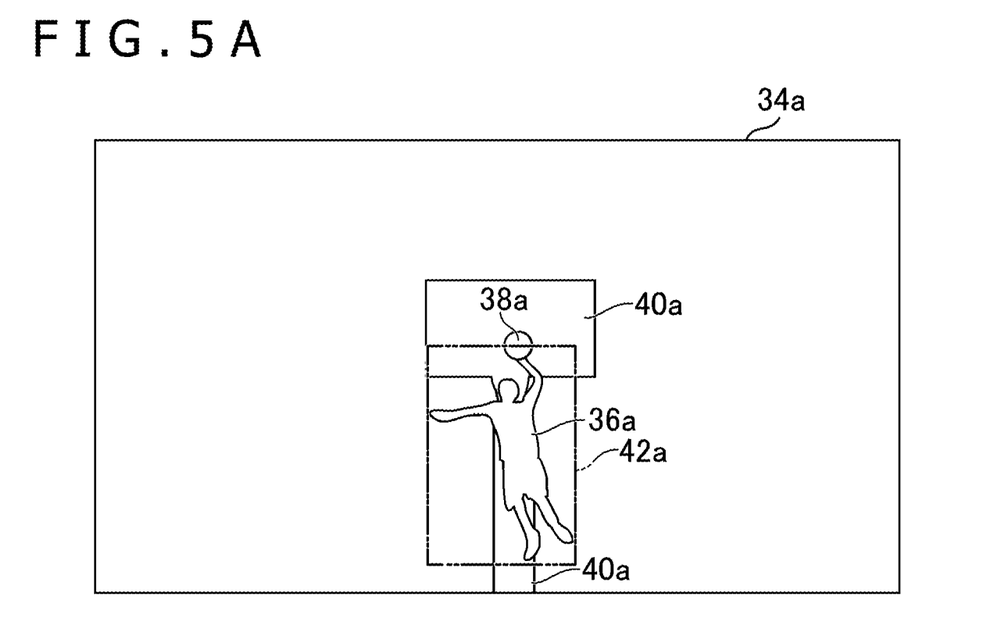
FIG. 5A is a diagram illustrating an example of a recognition result image.
Figure 5B:
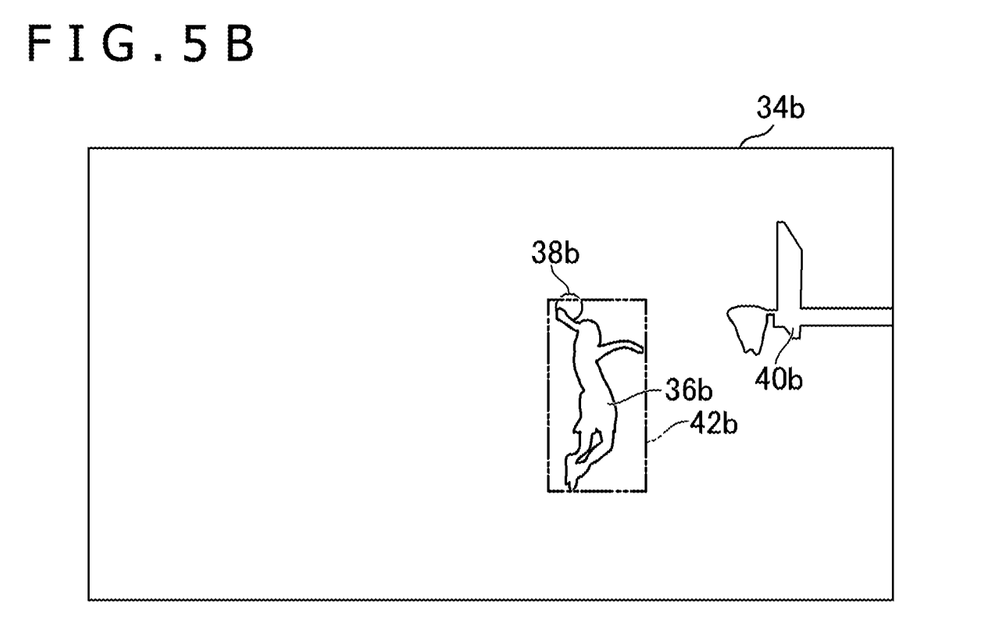
FIG. 5B is a diagram illustrating an example of a recognition result image.

FIG. 4A is a diagram illustrating an example of a captured image 32a that is an image captured by the camera 30a disposed behind the player 26. FIG. 4B is a diagram illustrating an example of a captured image 32b that is an image captured by the camera 30b arranged on the right of the player 26. In the present embodiment, for example, the semantic segmentation for the captured image 32 is executed before the semantic segmentation process for the voxel data is executed. Here, for example, the captured image 32 is input to a two-dimensional convolutional neural network (two-dimensional CNN) in which learning for performing semantic segmentation has been performed. In response to this input, the execution result of semantic segmentation for the captured image 32 is output from the two-dimensional CNN. FIGS. 5A and 5B each illustrate a recognition result image 34 that is an example of the execution result of semantic segmentation for the captured image 32. For example, FIG. 5A illustrates a recognition result image 34a that is an example of the execution result of semantic segmentation for the captured image 32a. FIG. 5B illustrates an example of a recognition result image 34b that is an example of the execution result of semantic segmentation for the captured image 32b.

As illustrated in FIGS. 5A and 5B, the recognition result image 34 is divided into a plurality of regions (a player area 36, a ball area 38, and a goal area 40, for example) that are associated with categories corresponding to objects that are recognition results on a pixel to pixel basis. The recognition result image 34a indicates a player area 36a associated with the player 26, a ball area 38a associated with the ball 24, and a goal area 40a associated with the goal 28. The recognition result image 34b indicates a player area 36b associated with the player 26, a ball area 38b associated with the ball 24, and a goal area 40b associated with the goal 28.

In the present embodiment, a partial area in the recognition result image 34 associated with a specific category is determined as a target two-dimensional region 42. FIG. 5A indicates a target two-dimensional region 42a, and FIG. 5B indicates a target two-dimensional region 42b.

Here, for example, the specific category described above may be set in advance. Here, for example, it is assumed that the player area 36 is set as a specific category. In this case, an area associated with the player area 36a in the recognition result image 34a may be determined as the target two-dimensional region 42a. Further, an area associated with the player area 36b in the recognition result image 34b may be determined as the target two-dimensional region 42b.

Here, as illustrated in FIGS. 5A and 5B, for example, a rectangular area circumscribing the player area 36 may be determined as the target two-dimensional region 42. Further, an area obtained by adding a margin area to the rectangular area circumscribing the player area 36 may be determined as the target two-dimensional region 42. For example, a region having the same center of gravity as that of the rectangular area circumscribing the player area 36 and having vertical and horizontal lengths longer than those of the rectangular area by predetermined lengths may be determined as the target two-dimensional region 42. Further, for example, a region having the same center of gravity as that of the rectangular area circumscribing the player area 36 and being larger than the rectangular area at a predetermined magnification larger than 1 may be determined as the target two-dimensional region 42. Further, the target two-dimensional region 42 does not need to be a rectangular area and, for example, an area inside an outline of pixels constituting the player area 36 may be determined as the target two-dimensional region 42.

In the present embodiment, a position and a size of a target two-dimensional region 44 in the captured image 32 are determined on the basis of a position and a size of the target two-dimensional region 42 in the recognition result image 34. Note that, here, it is assumed that the recognition result image 34 and the captured image 32 have the same shape and size, and the position and the size of the target two-dimensional region 42 in the recognition result image 34 and the position and the size of the target two-dimensional region 44 in the captured image 32 are the same.

Figure 6:
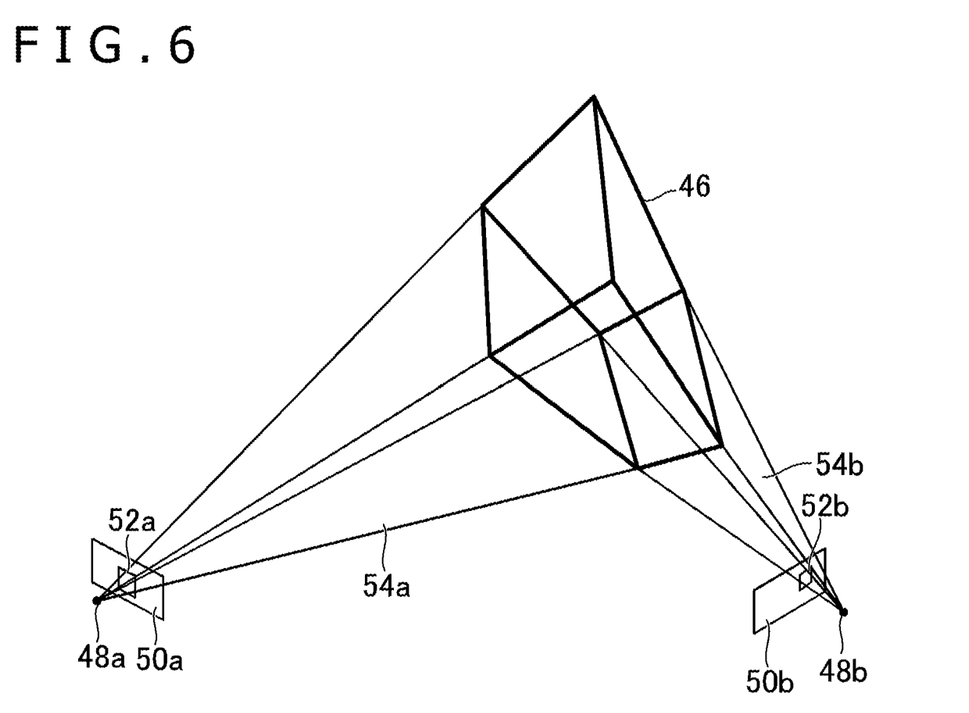
FIG. 6 is a diagram illustrating an example of a target three-dimensional region.

In the present embodiment, a target three-dimensional region 46 associated with the target two-dimensional region 44 and being in the real space 20 illustrated in FIG. 6 is determined on the basis of the target two-dimensional region 44 in the captured image 32. Here, for example, a three-dimensional region in the real space 20 projected onto the target two-dimensional region 44 in obtaining the captured image 32 may be determined as the target three-dimensional region 46.

FIG. 6 illustrates camera positions 48 corresponding to the positions of the cameras 30 when the cameras 30 each obtain the captured image 32, and virtual imaging planes 50 perpendicular to optical axes of the respective cameras 30. Here, it is assumed that a camera position 48a corresponds to the position of the camera 30a, and a camera position 48b corresponds to the position of the camera 30b. Further, it is assumed that an imaging plane 50a is a plane perpendicular to an optical axis of the camera 30a, and an imaging plane 50b is a plane perpendicular to an optical axis of the camera 30b.

On the imaging plane 50, a target two-dimensional region 52 corresponding to the target two-dimensional region 44 in the captured image 32 is indicated. FIG. 6 illustrates a target two-dimensional region 52a corresponding to a target two-dimensional region 44a in the captured image 32a and a target two-dimensional region 52b corresponding to a target two-dimensional region 44b in the captured image 32b. In the present embodiment, it is assumed that a relative position and a relative size of the target two-dimensional region 44 with respect to the captured image 32 are the same as a relative position and a relative size of the target two-dimensional region 52 with respect to the imaging plane 50, for example.

In the present embodiment, for example, the target three-dimensional region 46 is determined on the basis of the target two-dimensional region 52a and the target two-dimensional region 52b. Here, for example, a pyramid having no bottom surface with the camera position 48a as a vertex and the target two-dimensional region 52a as a cross section (a quadrangular pyramid 54a, for example) may be identified. Further, for example, a pyramid having no bottom surface with the camera position 48b as a vertex and the target two-dimensional region 52b as a cross section (a quadrangular pyramid 54b, for example) may be identified. Then, for example, a three-dimensional region where the quadrangular pyramid 54a and the quadrangular pyramid 54b intersect may be determined as the target three-dimensional region 46.

In the present embodiment, determination of the target three-dimensional region 46 based on the captured image 32 is executed as described above. Note that the above-described processing need not be performed on the captured images 32 obtained by all the cameras 30 used for generating voxel data. As described above, the above-described processing may be performed on the captured images 32 obtained by some of the cameras 30 (the camera 30a and the camera 30b, for example) used for generating voxel data.

In the present embodiment, for example, voxel data associated with positions in the target three-dimensional region 46 is input to a three-dimensional convolutional neural network (three-dimensional CNN) in which learning for performing semantic segmentation has been performed.

In response to this input, the execution result of semantic segmentation for the voxel data is output from the three-dimensional CNN. Here, for example, data of the execution result in which a category corresponding to an object that is a recognition result at a position represented by a three-dimensional coordinate value is associated with the three-dimensional coordinate value is output. On the basis of the data of the execution result, for example, the outline of the player 26 and the voxel group corresponding to the player 26 in the real space 20 that is a three-dimensional space are estimated.

Figure 7:
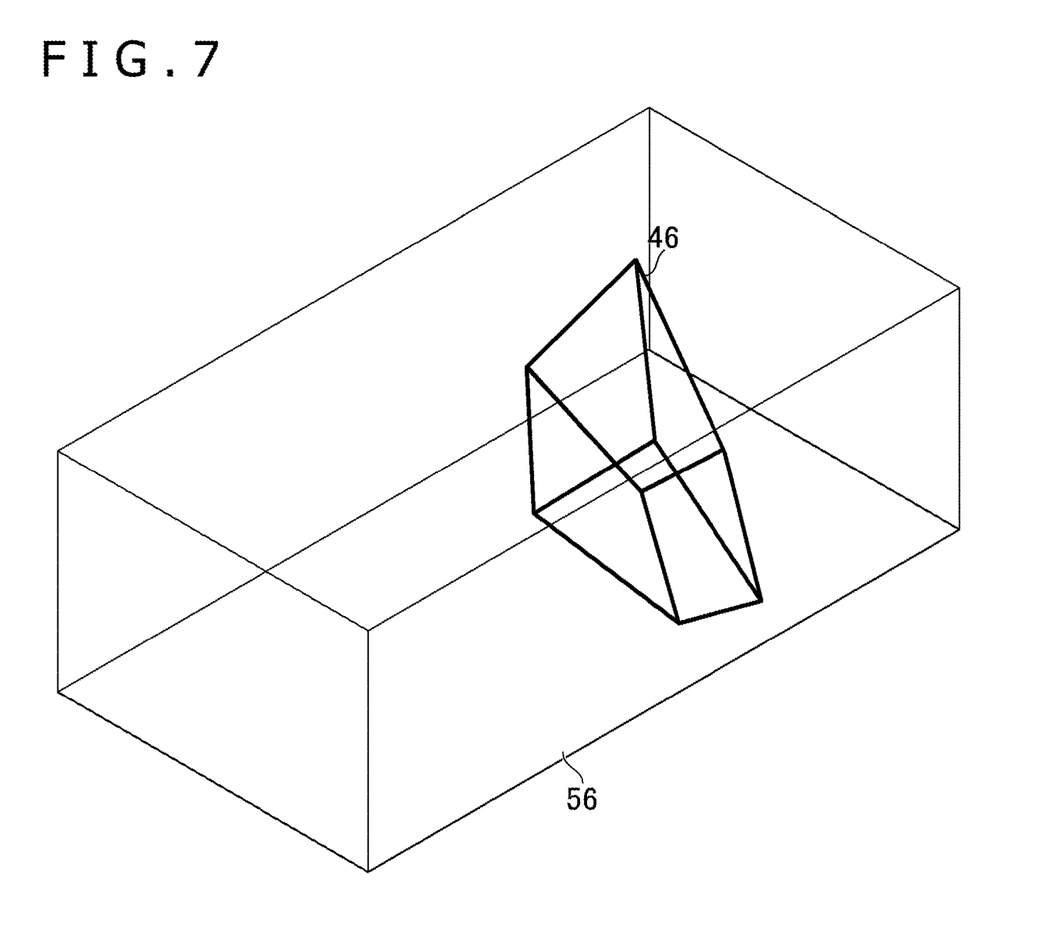
FIG. 7 is a diagram illustrating an example of a relation between a rectangular parallelepiped having a two-dimensional region occupied by a court as its bottom surface and the target three-dimensional region.

For example, it is assumed that the recognition processing using the three-dimensional CNN is executed for all the voxel data associated with voxels inside a rectangular parallelepiped 56 having the two-dimensional region occupied by the court 22 as the bottom surface, as illustrated in FIG. 7. If the processing is done in this way, recognition processing is performed also for a region unrelated to the player 26 who is a recognition object, and calculation cost is wasted.

Based on the above points, in the present embodiment, the target three-dimensional region 46 that is part of the three-dimensional space occupied by the rectangular parallelepiped 56 is determined by narrowing down the space as a region where the player 26 is likely to exist. Then, the recognition processing using the three-dimensional CNN is set to be executed on the target three-dimensional region 46 obtained by narrowing down. In this way, according to the present embodiment, recognition processing of the player 26 can be executed at a lower calculation cost than when the recognition processing using the three-dimensional CNN is performed on all the voxel data associated with the voxels inside the rectangular parallelepiped 56.

In the present embodiment, since the target three-dimensional region 46 is determined on the basis of the captured image 32 used for generating voxel data, it is not necessary to be bothered to separately prepare data for narrowing down the three-dimensional region. Thus, according to the present embodiment, narrowing down to the target three-dimensional region 46 where the recognition processing using the three-dimensional CNN is executed can be efficiently carried out.

Hereinafter, functions of the recognition processing device 10 according to the present embodiment and processing executed by the recognition processing device 10 will be further described.

Figure 8:
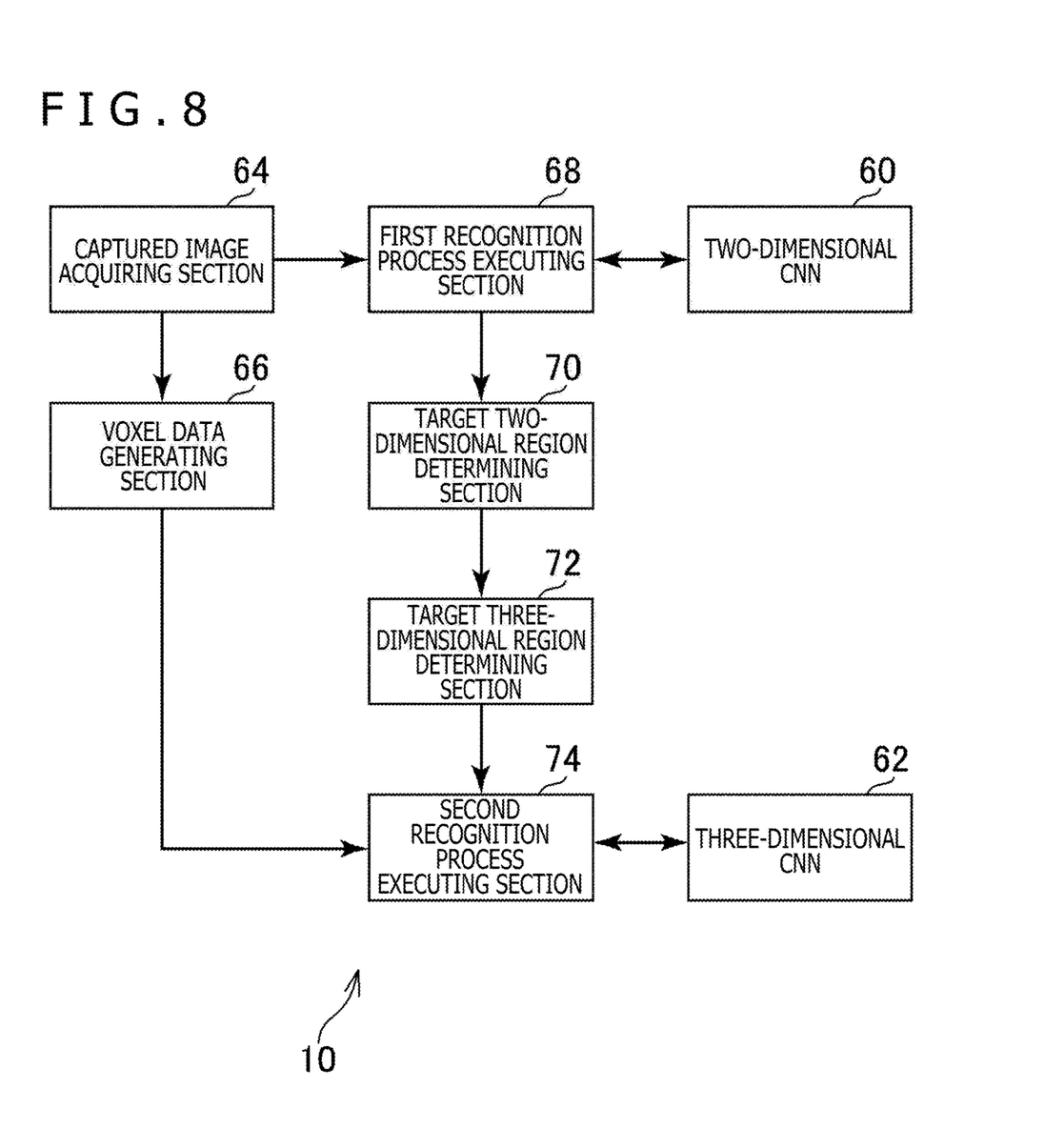
FIG. 8 is a functional block diagram illustrating an example of functions implemented in the recognition processing device according to the embodiment of the present invention.

FIG. 8 is a functional block diagram illustrating an example of functions implemented by the recognition processing device 10 according to the present embodiment. Note that the recognition processing device 10 according to the present embodiment does not have to include all the functions illustrated in FIG. 8, and may include functions other than the functions illustrated in FIG. 8.

As depicted in FIG. 8, the recognition processing device 10 functionally includes a two-dimensional CNN 60, a three-dimensional CNN 62, a captured image acquiring section 64, a voxel data generating section 66, a first recognition process executing section 68, a target two-dimensional region determining section 70, a target three-dimensional region determining section 72, and a second recognition process executing section 74, for example. The above elements are implemented mainly in the processor 12 and the storage unit 14.

The above functions may be implemented by causing the processor 12 to execute a program which is installed in the recognition processing device 10 that is a computer and which includes instructions corresponding to the above functions. This program may be supplied to the recognition processing device 10 via a computer-readable information storage medium such as an optical disc, a magnetic disk, a magnetic tape, a magneto-optical disk, or a flash memory, or via the Internet.

In the present embodiment, the two-dimensional CNN 60 is a two-dimensional convolutional neural network in which learning for performing semantic segmentation has been performed, for example. The two-dimensional CNN 60 may be, for example, a two-dimensional convolutional neural network that has been subjected to supervised learning using learning data including a two-dimensional image as input data and including an image whose region is divided according to categories, such as the recognition result image 34, as teacher data.

The three-dimensional CNN 62 is, for example, a three-dimensional convolutional neural network in which learning for performing semantic segmentation has been performed in the present embodiment. For example, the three-dimensional CNN 62 may be a three-dimensional convolutional neural network in which supervised learning has been performed using learning data including voxel data as input data and including voxel data whose region is divided according to categories as teacher data.

The captured image acquiring section 64 acquires the captured image 32 obtained by the camera 30, for example, in the present embodiment.

The voxel data generating section 66 generates voxel data on the basis of the captured image 32 acquired by the captured image acquiring section 64, for example, in the present embodiment.

The first recognition process executing section 68 executes a first recognition process on the captured image 32 obtained by capturing an image of the real space 20 and used for generating voxel data, for example, in the present embodiment. Here, for example, the first recognition process using the two-dimensional CNN 60 may be performed on the captured image 32. Note that, as described above, the first recognition process need not be executed for all of the captured images 32 used for generating the voxel data. For example, the first recognition process may be executed only on the captured image 32a and the captured image 32b that are some of the captured images 32 used for generating the voxel data.

For example, the first recognition process executing section 68 identifies the recognition result image 34a that is an output when the captured image 32a is input to the two-dimensional CNN 60, and the recognition result image 34b that is an output when the captured image 32b is input to the two-dimensional CNN 60 as a result of the first recognition process. As described above, the first recognition process executing section 68 may execute the first recognition process using the two-dimensional CNN 60 on the captured image 32. In addition, the first recognition process executing section 68 may identify a specific object such as the player 26 represented by the captured image 32.

In the present embodiment, for example, the target two-dimensional region determining section 70 determines the target two-dimensional region 44 that occupies part of the captured image 32 on the basis of the result of the first recognition process. Here, for example, the target two-dimensional region 44a occupying part of the captured image 32a and the target two-dimensional region 44b occupying part of the captured image 32b may be determined. Further, for example, the target two-dimensional region determining section 70 may determine a region occupied by an image of a specific object such as the player 26 identified by the first recognition process executing section 68 as the target two-dimensional region 44.

For example, as described above, the target two-dimensional region 42a in the recognition result image 34a may be determined on the basis of the player area 36a in the recognition result image 34a. Then, a region in the captured image 32a corresponding to the target two-dimensional region 42a in the recognition result image 34a may be determined as the target two-dimensional region 44a. Further, the target two-dimensional region 42b in the recognition result image 34b may be determined on the basis of the player area 36b in the recognition result image 34b. Then, a region in the captured image 32b corresponding to the target two-dimensional region 42b in the recognition result image 34b may be determined as the target two-dimensional region 44b.

The target three-dimensional region determining section 72 determines the target three-dimensional region 46 on the basis of the target two-dimensional region 44 and the position of the camera 30 when the camera 30 obtains the captured image 32 in the present embodiment, for example. Here, the target three-dimensional region determining section 72 may identify, for example, pyramids each having no bottom surface with the camera position 48 as a vertex and the target two-dimensional region 52 as a cross section (quadrangular pyramid 54a and quadrangular pyramid 54b), as described above. Then, for example, the target three-dimensional region determining section 72 may determine a three-dimensional region where the quadrangular pyramid 54a and the quadrangular pyramid 54b intersect as the target three-dimensional region 46.

In the present embodiment, for example, the second recognition process executing section 74 executes a second recognition process using the three-dimensional CNN 62 for voxel data associated with positions in the target three-dimensional region 46. Here, for example, the second recognition process using the three-dimensional CNN 62 may be performed on the voxel data associated with positions in the three-dimensional region in the real space 20 according to the first three-dimensional region corresponding to the quadrangular pyramid 54a and the second three-dimensional region corresponding to the quadrangular pyramid 54b. Further, for example, the second recognition process using the three-dimensional CNN 62 may be executed on voxel data associated with the positions in the target three-dimensional region 46 where the quadrangular pyramid 54a and the quadrangular pyramid 54b intersect.

For example, voxel data associated with the positions in the target three-dimensional region 46 may be input to the three-dimensional CNN 62. Then, the data of the execution result of the semantic segmentation with respect to the voxel data, output from the three-dimensional CNN 62 in response to this input, may be identified. Based on the data of the execution result, for example, the outline of the player 26 and a voxel group corresponding to the player 26 in the real space 20 that is a three-dimensional space may be estimated.

Figure 9:
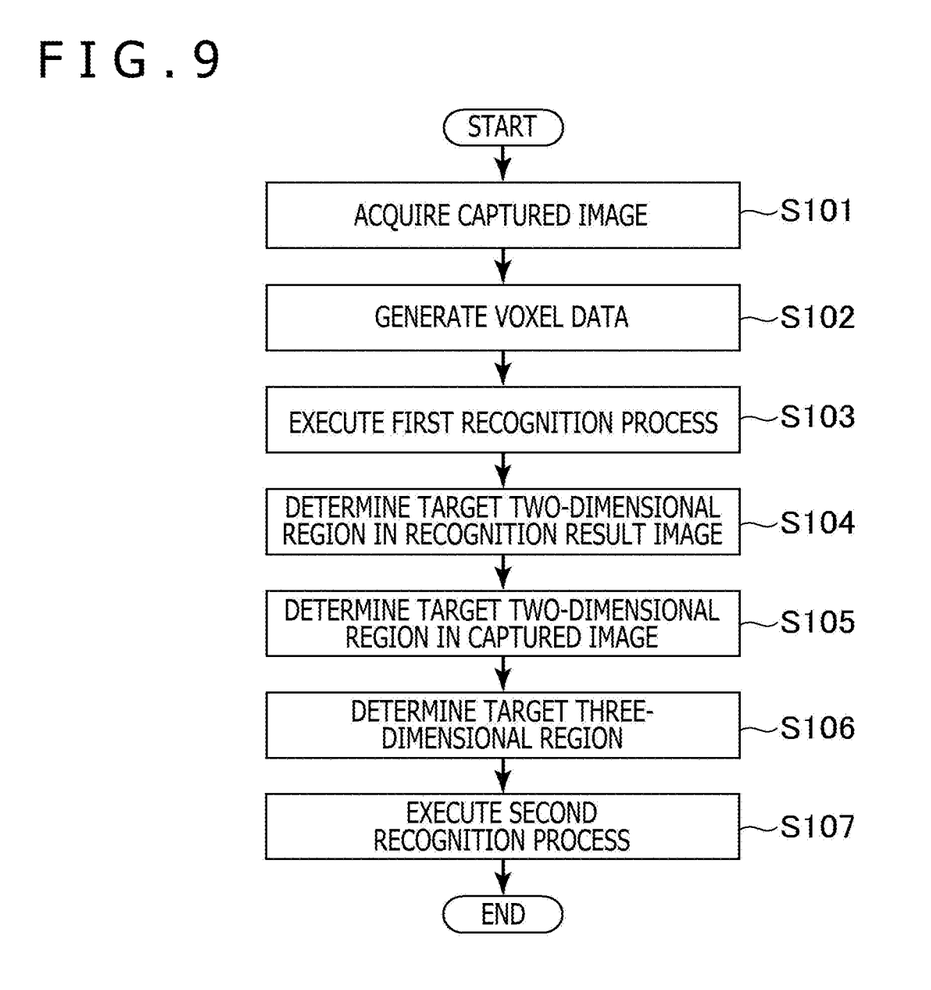
FIG. 9 is a flowchart illustrating an example of a flow of processing performed by the recognition processing device according to the embodiment of the present invention.

Here, an example of a flow of processing performed by the recognition processing device 10 according to the present embodiment will be described with reference to a flowchart illustrated in FIG. 9.

First, the captured image acquiring section 64 acquires a plurality of captured images 32 including the captured image 32a and the captured image 32b (S101).

Then, the voxel data generating section 66 generates voxel data on the basis of the plurality of captured images 32 acquired in the process indicated in S101 (S102). Here, for example, it is assumed that voxel data associated with voxels inside the rectangular parallelepiped 56 illustrated in FIG. 7 is generated.

Then, the first recognition process executing section 68 executes the first recognition process on the captured image 32a acquired in the process indicated in S101, and executes the first recognition process on the captured image 32b acquired in the process indicated in S101 (S103). Here, for example, semantic segmentation using the two-dimensional CNN 60 is executed. Then, the recognition result image 34a and the recognition result image 34b are output from the two-dimensional CNN 60 as the execution result of the first recognition process, for example.

Then, the target two-dimensional region determining section 70 determines the target two-dimensional region 42 in the recognition result image 34 (S104). Here, for example, the target two-dimensional region 42a in the recognition result image 34a is determined on the basis of the recognition result image 34a output in the process indicated in S103. Further, the target two-dimensional region 42b in the recognition result image 34b is determined on the basis of the recognition result image 34b output in the process indicated in S103. Here, a region associated with a predetermined specific category as described above may be determined as the target two-dimensional region 42. For example, a rectangular area circumscribing the player area 36, an area obtained by adding a margin area to the rectangular area circumscribing the player area 36, an area inside the outline of the pixels constituting the player area 36, and the like may be determined as the target two-dimensional region 42.

Then, the target two-dimensional region determining section 70 determines the target two-dimensional region 44 in the captured image 32 (S105). Here, for example, the target two-dimensional region 44a in the captured image 32a is determined on the basis of the target two-dimensional region 42a in the recognition result image 34a determined in the process indicated in S104. Further, the target two-dimensional region 44b in the captured image 32b is determined on the basis of the target two-dimensional region 42b in the recognition result image 34b determined in the process indicated in S104.

Then, the target three-dimensional region determining section 72 determines the target three-dimensional region 46 on the basis of the target two-dimensional region 44 determined in the process indicated in S105 (S106).

Then, the second recognition process executing section 74 executes the second recognition process on the voxel data corresponding to the voxels in the target three-dimensional region 46 determined in the process indicated in S106, which is part of the voxel data generated in the process indicated in S102 (S107). Then, the processing indicated in this processing example is finished. In the process indicated in S107, for example, semantic segmentation using the three-dimensional CNN 62 may be executed. The second recognition process executing section 74 may input voxel data corresponding to voxels in the target three-dimensional region 46 determined in the process indicated in S106 to the three-dimensional CNN 62, for example. Then, the second recognition process executing section 74 may identify the data of the execution result of the semantic segmentation with respect to voxel data output from the three-dimensional CNN 62 in response to the input. On the basis of the data of the execution result, for example, the outline of the player 26 and a voxel group corresponding to the player 26 in the real space 20 that is a three-dimensional space may be estimated.

In the above processing example, voxel data associated with the voxels inside the rectangular parallelepiped 56 is generated in the process indicated in S102, and part of the voxel data is selected in the process indicated in S107. Here, for example, after the process indicated in S101, the process indicated in S103 may be executed without executing the process indicated in S102. Then, after the process indicated in S106, the voxel data generating section 66 may generate the voxel data associated with the voxels inside the target three-dimensional region 46 determined by the process indicated in S106. In the process indicated in S107, the second recognition process may be executed on the voxel data generated in this way. In this way, the calculation cost for generating the voxel data is lower than when voxel data associated with all the voxels inside the rectangular parallelepiped 56 is generated.

Further, for example, the recognition processing device 10 may sequentially receive the captured images 32 obtained at a predetermined sampling rate. Then, the recognition processing device 10 may repeatedly execute steps S101 to S107 at the sampling rate on the basis of the sequentially received captured images 32.

Moreover, the determination method of the target three-dimensional region 46 is not limited to the above-mentioned method.

For example, the target three-dimensional region 46 may be determined on the basis of an image generated by one camera 30. Further, for example, the target three-dimensional region 46 may be determined on the basis of depth information associated with positions in the target two-dimensional region 44 in the captured image 32.

For example, it is assumed that the camera 30a is a camera capable of capturing an image including depth information, which generates the captured image 32a and a depth image. In this case, the target two-dimensional region in the depth image associated with the target two-dimensional region 44a in the captured image 32a may be determined.

Here, it is assumed that a minimum value of values representing the depth (distance from the camera 30 to the subject) associated with respective pixels in the target two-dimensional region in the depth image is z1, and a maximum value is z2. In this case, part of the quadrangular pyramid 54a may be determined as the target three-dimensional region 46 on the basis of the values z1 and z2.

For example, a quadrangular pyramid which corresponds to part of the quadrangular pyramid 54a and whose distance from the camera position 48a is from z1 to z2 may be determined as the target three-dimensional region 46. Alternatively, for example, a quadrangular pyramid which corresponds to part of the quadrangular pyramid 54a and whose distance from the camera position 48a is from z1 to k×z1 may be determined as the target three-dimensional region 46 (k is a predetermined coefficient more than or equal to 1 such as 1.5 or 2). Further, for example, a quadrangular pyramid which corresponds to part of the quadrangular pyramid 54a and whose distance from the camera position 48a is from z1−d to k×z1+d may be determined as the target three-dimensional region 46 (d is a predetermined threshold value).

In addition, a three-dimensional region where parts of the quadrangular pyramids each identified as described above for each of the plurality of cameras 30 intersect may be determined as the target three-dimensional region 46.

Further, for example, voxel data may be generated by a feature point matching method in spatial reconstruction by simultaneous localization and mapping (SLAM). In this case, the recognition result by semantic segmentation by the two-dimensional CNN, associated with the voxel data, may be mapped. Then, for example, semantic segmentation by the three-dimensional CNN may be performed on voxel data mapped to the player 26, for example.

Further, the method for determining the target two-dimensional region 44 is not limited to the above-described method.

For example, the first recognition process executing section 68 may execute a process of identifying a region to be observed closely in the captured image 32 using a visual attention technique. Then, the target two-dimensional region determining section 70 may determine the region identified by the first recognition process executing section 68 as the target two-dimensional region 44 in the captured image 32.

Note that the present invention is not limited to the above-described embodiment.

The specific character strings and numerical values described above and the specific character strings and numerical values in the drawings are examples, and these for the present invention are not limited to the mentioned character strings and numerical values.

The invention claimed is:

1. A recognition processing device executing recognition processing using a three-dimensional convolutional neural network on voxel data in which a position in a real space and a voxel value are associated with each other, the recognition processing device comprising:
   a first recognition process executing section executing a first recognition process on a captured image which is obtained by capturing an image of the real space and which is used to generate the voxel data;
   a two-dimensional region determining section determining a two-dimensional region occupying part of the captured image on a basis of a result of the first recognition process;
   a three-dimensional region determining section determining a three-dimensional region in the real space on a basis of the two-dimensional region and a position of a camera when the camera obtains the captured image; and
   a second recognition process executing section executing a second recognition process using a three-dimensional convolutional neural network on the voxel data associated with a position in the three-dimensional region, wherein:
   the first recognition process executing section executes the first recognition process on each of a first captured image and a second captured image obtained by capturing images of the real space from positions different from each other, and
   the two-dimensional region determining section determines a first two-dimensional region occupying part of the first captured image and a second two-dimensional region occupying part of the second captured image on a basis of a result of the first recognition process.

2. The recognition processing device according to claim 1, wherein:
   the three-dimensional region determining section determines a first three-dimensional region determined on a basis of the first two-dimensional region and a position of a camera when the camera obtains the first captured image, and a second three-dimensional region determined on a basis of the second two-dimensional region and a position of a camera when the camera obtains the second captured image, and
   the second recognition process executing section executes the second recognition process using the three-dimensional convolutional neural network on the voxel data associated with a position in the three-dimensional region in the real space according to the first three-dimensional region and the second three-dimensional region.

3. The recognition processing device according to claim 1, wherein
   the first recognition process executing section executes the first recognition process on a captured image associated with depth information, and
   the three-dimensional region determining section determines the three-dimensional region in the real space on a basis of the depth information associated with a position in the two-dimensional region.

4. The recognition processing device according to claim 1, wherein the first recognition process executing section executes the first recognition process using a two-dimensional convolutional neural network on the captured image.

5. The recognition processing device according to claim 2, wherein the second recognition process executing section executes the second recognition process using the three-dimensional convolutional neural network on the voxel data associated with a position in the three-dimensional region where the first three-dimensional region and the second three-dimensional region intersect.

6. A recognition processing method for executing recognition processing using a three-dimensional convolutional neural network on voxel data in which a position in a real space and a voxel value are associated with each other, the recognition processing method comprising:
   executing a first recognition process on a captured image which is obtained by capturing an image of the real space and which is used to generate the voxel data;
   determining a two-dimensional region occupying part of the captured image on a basis of a result of the first recognition process;
   determining a three-dimensional region in the real space on a basis of the two-dimensional region and a position of a camera when the camera obtains the captured image; and
   executing a second recognition process using a three-dimensional convolutional neural network on the voxel data associated with a position in the three-dimensional region, wherein:
   the executing includes executing the first recognition process on each of a first captured image and a second captured image obtained by capturing images of the real space from positions different from each other, and
   the determining a two-dimensional region includes determining a first two-dimensional region occupying part of the first captured image and a second two-dimensional region occupying part of the second captured image on a basis of a result of the first recognition process.

7. A non-transitory, computer-readable storage medium containing a program, which when executed by a computer, causes the computer to execute recognition processing using a three-dimensional convolutional neural network on voxel data in which a position in a real space and a voxel value are associated with each other by carrying out actions, comprising:
   executing a first recognition process on a captured image which is obtained by capturing an image of the real space and which is used to generate the voxel data;
   determining a two-dimensional region occupying part of the captured image on a basis of a result of the first recognition process;
   determining a three-dimensional region in the real space on a basis of the two-dimensional region and a position of a camera when the camera obtains the captured image; and
   executing a second recognition process using a three-dimensional convolutional neural network on the voxel data associated with a position in the three-dimensional region, wherein:
   the executing includes executing the first recognition process on each of a first captured image and a second captured image obtained by capturing images of the real space from positions different from each other, and
   the determining a two-dimensional region includes determining a first two-dimensional region occupying part of the first captured image and a second two-dimensional region occupying part of the second captured image on a basis of a result of the first recognition process.

* * * * *